Patented Apr. 2, 1935

1,996,087

UNITED STATES PATENT OFFICE 1,996,087

PROCESS OF MAKING MOLDED ARTICLES FROM UREA OR ITS DERIVATIVES, SOLID POLYMERIC ALDEHYDES, AND FILLING BODIES

Otto Süssenguth, Erkner, near Berlin, Germany, assignor, by mesne assignments, to Bakelite Corporation, New York, N. Y., a corporation of Delaware No Drawing. Application January 23, 1929, Serial No. 334,601. In Germany February 3, 1928

4 Claims. (Cl. 18—55)

Numerous processes for the purpose of making condensation products from urea and formaldehyde have already been proposed.

According to those well known processes the condensation of urea and formaldehyde is effected in an aqueous solution and in order to produce the pure resin, a long and difficult distillation process is necessary. The resins obtained are thereafter hardened in molding forms or mixed with filling bodies and subjected to hot-press molding.

According to my invention it is possible to manufacture molded articles from urea and formaldehyde in a much simpler and more perfect way by condensing the components in the absence of solvents in a dry state as described hereafter, that is to say by employing solid polymeric aldehydes instead of the usual aldehyde solutions. In view of the simplification of the equipment and of considerable saving of time the present process offers great economical and technical advantages.

According to my invention urea, paraformaldehyde and suitable filling bodies of organic or inorganic nature, for instance cellulose and its derivatives, wood flour, asbestos, kaolin, graphite are thoroughly ground, for example in a ball mill or in another appropriate device until a homogeneous mixture is obtained. The urea can be mixed with the filling bodies and then with paraformaldehyde, or the filling bodies can be added to the mixture of paraformaldehyde and urea, or these three components can be introduced together into the mixing device. The resulting mixture is then transferred to a hot press where it is pressed, under the conditions well known in the art, to ready molded articles. The articles obtained have a high polish, are of a good mechanical and chemical resistance and may be worked in a similar manner as the well known hardened, infusible phenol-formaldehyde-condensation products. By using suitable filling bodies, for instance certain kinds of paper, asbestos and lithopone, it is possible to obtain articles which are of a pure white colour and fast to light.

The mixture may also be subjected to cold pressing, thereafter heating the articles to temperatures of 100-120 degrees C. The cold pressed articles are heated at a temperature of 100-120 degrees for instance for two to five hours.

If fibrous substances are to be incorporated into the mixture, then the components must be mixed preferably hot in a kneading machine or on mixing rolls or in other suitable devices. For instance a mixture of urea and paraformaldehyde is made in the proportions indicated hereafter. This mixture of urea and paraformaldehyde begins to melt already at a temperature of 60-70 degrees C. and penetrates the fibrous substances completely. The hot mixture must be kneaded until a substance is obtained which is brittle when cooled and which may then be ground and subjected to hot-press molding.

The mechanical and chemical resistance of the molded articles obtained according to my invention may vary by adding suitable admixtures to the press mixture of urea, paraformaldehyde and filling bodies. Such admixtures may be natural resins, for instance colophony, copal, artificial resins capable or not capable of hardening, for instance condensation products from phenols and aldehydes, phthalic acid, glyceric ester, or substances capable of binding free formaldehyde as for instance phenol, p-toluolsulfamide, amines and substances binding the water which is formed during the condensation of resin, such as gypsum, cement etc. Several of these substances may be mixed with each other and then added to the molding mixture.

Example 1

A mixture of

| | Parts by weight |
|---|---|
| Urea | 100 |
| Paraformaldehyde | 100 |
| Lithopone | 250 | is ground in a ball mill until a complete homogeneous mixture is obtained. The mixture may be pressed, for instance at 150° C. or at 180° C., thereafter being cooled.

Example 2

| | Parts by weight |
|---|---|
| Urea | 100 |
| Paraformaldehyde | 100 |
| Lithopone | 200 |
| Paper pulp | 100 |
| Phenol formaldehyde resin | 50 | are mixed in the heat in a kneading machine until a mass is obtained which is brittle when cooled and which is then ground and subjected to hot press molding as indicated in Example 1.

Example 3

| | Parts by weight |
|---|---|
| Urea | 100 |
| Paraformaldehyde | 100 |
| p-toluolsulfamide | 20 |
| Calcined gypsum | 100 |
| Lithopone | 100 |
| Paper pulp | 50 | are ground in a ball mill and molded under hot press conditions as described in Example 1.

Instead of urea, derivatives of the same, for instance thio-urea, acetyl-urea, may be used, and other suitable solid aldehydes, for instance trioxymethylene, poloxymethylene, may replace the paraformaldehyde, and the terms urea compound and "solid aldehydes" are applied herein to all these compositions. The invention is not restricted to the application of urea and paraformaldehyde, and likewise it is not restricted to the indicated special proportions and to the described special procedures of mixing, molding etc. The expression "filling bodies" is used herein to include also colouring and plasticizing agents or the other usual admixtures.

I claim:

1. Process of making a molded article which comprises commingling in the dry solid state a urea compound, a solid polymeric aldehyde and a filler, and then hot molding the mixture to cause a resin condensation and the hardening of the resulting resin simultaneously with the formation of the article.

2. Process of making a molded article as defined in claim 1 in which the filler is of a basic character.

3. Process of making a molded article as defined in claim 1 in which the filler is lithopone.

4. Process of making a molded article as defined in claim 1 in which the filler comprises a fibrous material and in which the commingling operation is carried out at a temperature sufficient to cause melting of the urea-solid polymeric aldehyde mixture and penetration thereby of the fibrous material.

OTTO SÜSSENGUTH.